United States Patent [19]
Ito et al.

[11] Patent Number: 5,999,249
[45] Date of Patent: Dec. 7, 1999

[54] POSITION DETECTING ELEMENT AND RANGE SENSOR

[75] Inventors: Masami Ito; Kanji Nishii; Kenji Takamoto; Atsushi Fukui; Kazumasa Takata, all of Osaka, Japan

[73] Assignee: Matsushita Electric Industrial Co., Ltd., Osaka, Japan

[21] Appl. No.: 08/950,282

[22] Filed: Oct. 14, 1997

[30]     Foreign Application Priority Data

Oct. 17, 1996   [JP]   Japan ..................................... 8-274927

[51] Int. Cl.⁶ ............................. G01C 3/00; G02B 7/04; G01N 21/86
[52] U.S. Cl. ................... 356/3.07; 250/201.6; 250/548.1
[58] Field of Search ................................ 356/3.01–3.15; 348/332, 294; 250/548.1, 201.6

[56]          References Cited

U.S. PATENT DOCUMENTS

| | | | |
|---|---|---|---|
| 4,303,335 | 12/1981 | Matsuda et al. | 356/3.06 |
| 4,313,654 | 2/1982 | Matsui et al. | 356/3.06 |
| 5,210,585 | 5/1993 | Suzuki | 356/3.08 |
| 5,245,398 | 9/1993 | Ludden | 356/3.06 |

FOREIGN PATENT DOCUMENTS

62-028610   2/1987   Japan .

*Primary Examiner*—Stephen C. Buczinski
*Attorney, Agent, or Firm*—Merchant & Gould P.C.

[57]          ABSTRACT

A position detecting element that enables a position to be detected at high speed and high precision, and a range sensor using the same. The position detecting element is provided with a PIN photodiode array 1 having n segments and a parallel arithmetic processing portion 2 that calculates the segment having maximum intensity by comparing n outputs from the segments of the PIN photodiode array 1. The range sensor includes a light source by which the object to be measured is irradiated by optical beam, a lens that gathers rays of the reflected light from the surface of the object to be measured and the position detecting element mentioned above that detects the position of the light gathered by the lens.

4 Claims, 7 Drawing Sheets

POSITION DETECTING ELEMENT AND RANGE SENSOR

FIELD OF THE INVENTION

This invention relates to a position detecting element which enables a position to be detected at high speed and high precision and to a range sensor using the same.

BACKGROUND OF THE INVENTION

Figure 7:
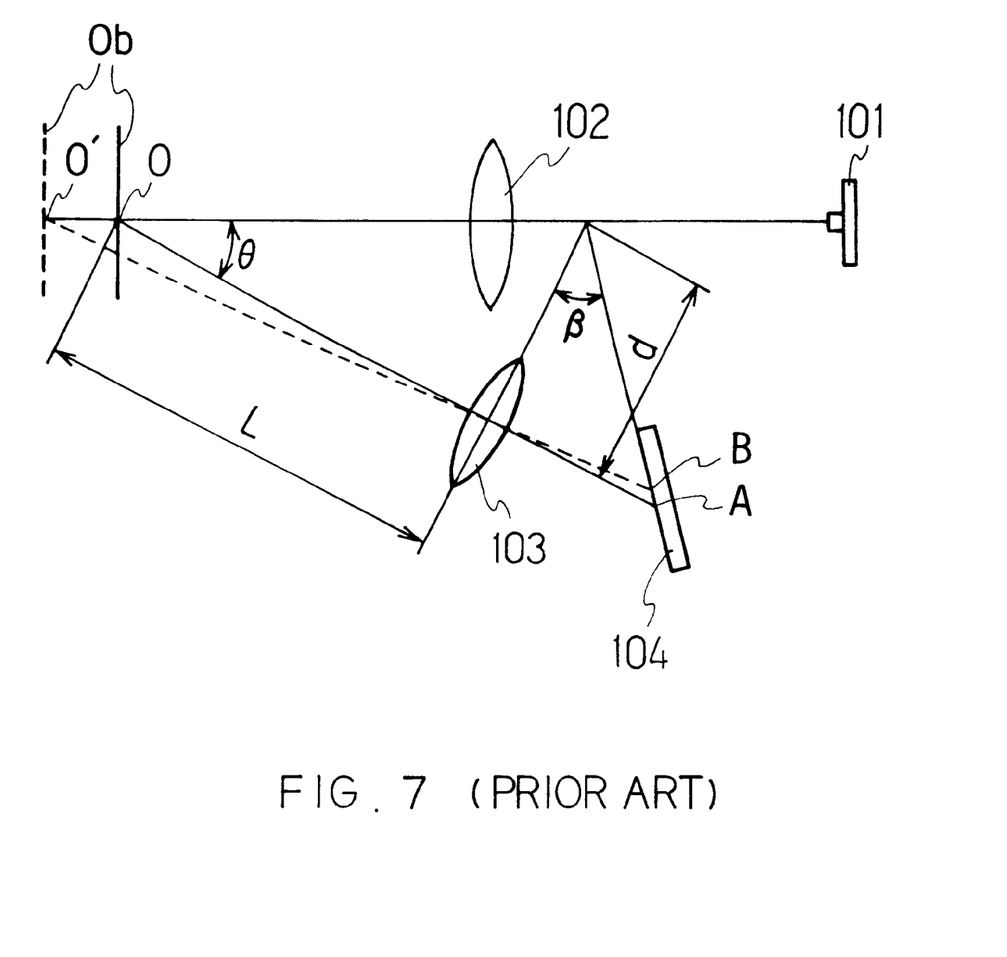
FIG. 7 shows a basic block diagram of the range sensor using the conventional position detecting element.

A range sensor using a conventional position detecting element is, for example, disclosed in JP62-28610. FIG. 7 shows the optical system that is the basic component of this range sensor.

FIG. 7 includes a light source 101 using an emitting element such as a light-emitting diode, a semiconductor laser and the like, a first lens 102, a second lens 103 whose focal length is f and a position detecting element 104 using PSD or CCD. The optical system in FIG. 7 is structured in order to fulfill the Scheimpflug condition. That is, the following equation (Equation 1) shows the relations of (1) the angle θ formed by the optical axis of the light source 101 and the optical axis of the second lens 103, (2) the angle β formed by the principal plane of the second lens 103 and the detecting plane of the position detecting element 104, (3) the distance L from the intersection O of the optical axis of the light source 101 and the optical axis of the second lens 103 to the second lens 103, and (4) the distance d between the intersection of the optical axis of the light source 101 and the principal plane of the second lens 103 and the principal point of the second lens 103.

$$\beta = \tan^{-}(f0/d), \quad \text{Equation 1}$$

where $f0 = f \cdot L/(L-f)$. In Equation 1, f indicates the focal length of the second lens 103. When the Scheimpflug condition is fulfilled, the optical beam reflected by the object to be measured through the first lens 102 after exiting from the light source 101 forms images on the position detecting element 104 by the second lens 103 in case where the object to be measured Ob is located not only at the intersection O of the optical axis of the light source 101 and the optical axis of the second lens 103 but also at the position O' deviated from the intersection O on the optical axis as shown by the broken line.

The principle of measuring distance by using this kind of range sensor is explained as follows. The part of the light reflected from the object to be measured Ob forms images at the point A on the position detecting element 104 by the second lens 103, when the object to be measured Ob is located at the position O. The part of the light reflected from the object to be measured Ob forms images at the point B on the position detecting element 104 as shown by the broken line in FIG. 7, when the object to be measured Ob has moved to the position O'. Thus, the position on the optical axis of the light source 101 is converted into the position of the image-formation on the position detecting element 104. Consequently, the shift, unevenness and the like of the object to be measured can be determined by measuring the shift of the position of the image-formation on the position detecting element 104.

However, the position detecting element mentioned above has the following problems. When PSD is used as a position detecting element and the position is detected by the sampling rate of more than 10 MHz, a resolution (normalized by the length of PSD) is on the order of 1/100, which is not enough. On the other hand, when CCD, which is for example a line sensor of 5000 pixels, is used as a position detecting element, the resolution (normalized by the length of CCD) reaches 1/5000. However, the scan rate of CCD is only on the order of several KHz and it is difficult to realize the high speed scan like at the scan rate of 10 MHz. Thus, it was difficult to detect a position at high speed (more than 10 MHz) and high precision (high resolution) using the conventional position detecting elements. As a result, it was difficult to have both the high speed performance of more than 10 MHz and the distance measurement of the high precision in the range sensor using this kind of position detecting elements.

SUMMARY OF THE INVENTION

The present invention is directed to solve the conventional problems mentioned above and to provide a position detecting element that enables a position to be detected at high speed and high precision, and a range sensor using the same.

A first structure of the position detecting element according to the present invention is characterized by being provided with a photo detection element array having n segments and a parallel arithmetic processing portion that calculates the segment having maximum intensity by comparing the outputs from the segments of the photo detection element array.

The second structure is characterized by being provided with a photo detection element array having n segments and a parallel arithmetic processing portion that calculates the peak position of intensity with a precision of the sub-segment based on the outputs from the segments of the photo detection element array.

Furthermore, the third structure is characterized by including (1) a photo detection element array having n segments, (2) a pair of wedge-shaped photo detection elements, (3) a first parallel arithmetic processing portion that calculates the rough position in which the intensity is maximum based on the outputs from the pair of photo detection elements, (4) a second parallel arithmetic processing portion that selects m signals near the rough position from the outputs of the segments in the photo detection element array based on the rough position in which the intensity is maximum, and which is calculated by the first parallel arithmetic processing portion and (5) a third parallel arithmetic processing portion that calculates the maximum position of the intensity from the output of the second parallel arithmetic processing portion with a precision of the sub-segment.

In addition, the range sensor according to the present invention comprises (1) a light source by which the object to be measured is irradiated with an optical beam, (2) a lens that gathers rays of the reflected light from the surface of the object to be measured and (3) a position detecting element that detects the position of the light gathered by the lens, that is one having the structure mentioned above according to the present invention.

BRIEF DESCRIPTION OF THE DRAWINGS

FIG. 8 shows a flowchart of sub-segment processing of the position detecting element in the present invention.

DETAILED DESCRIPTION OF THE INVENTION

The present invention will be explained in detail by referring to the attached figures as follows.

(The First Embodiment)

Figure 1:
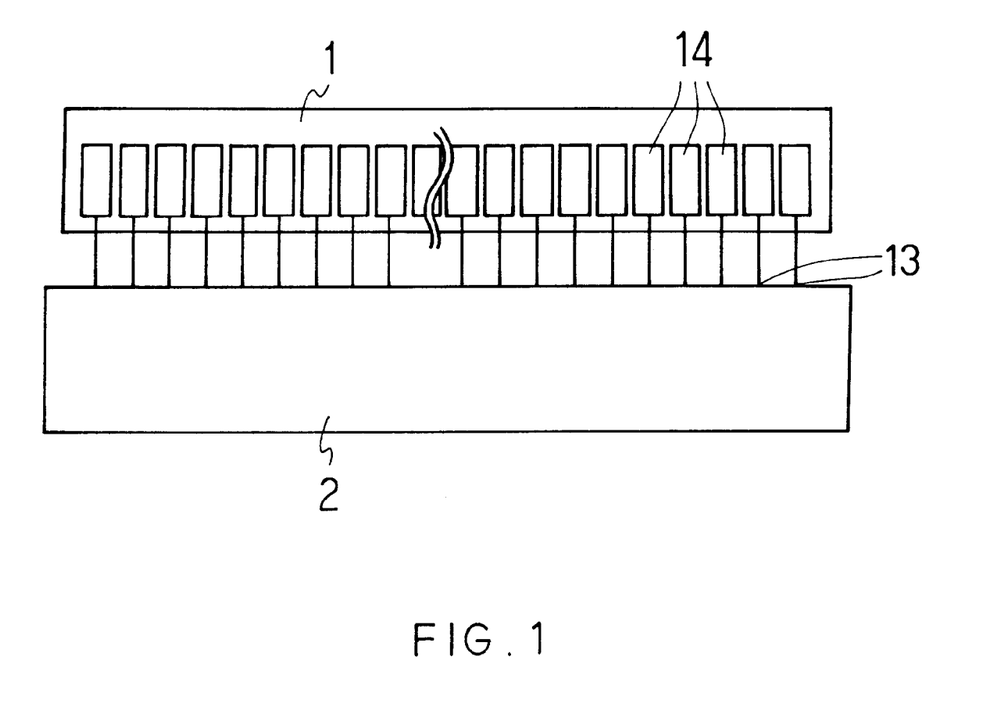
FIG. 1 shows a basic block diagram of the position detecting element according to the First Embodiment in the present invention.

FIG. 1 shows a basic block diagram of the position detecting element according to the First Embodiment of the present invention. FIG. 1 includes a PIN photodiode array 1 having n segments and a parallel arithmetic processing portion 2 that calculates the segment having maximum intensity by comparing the n outputs from the segments of the PIN photodiode array.

Figure 2:
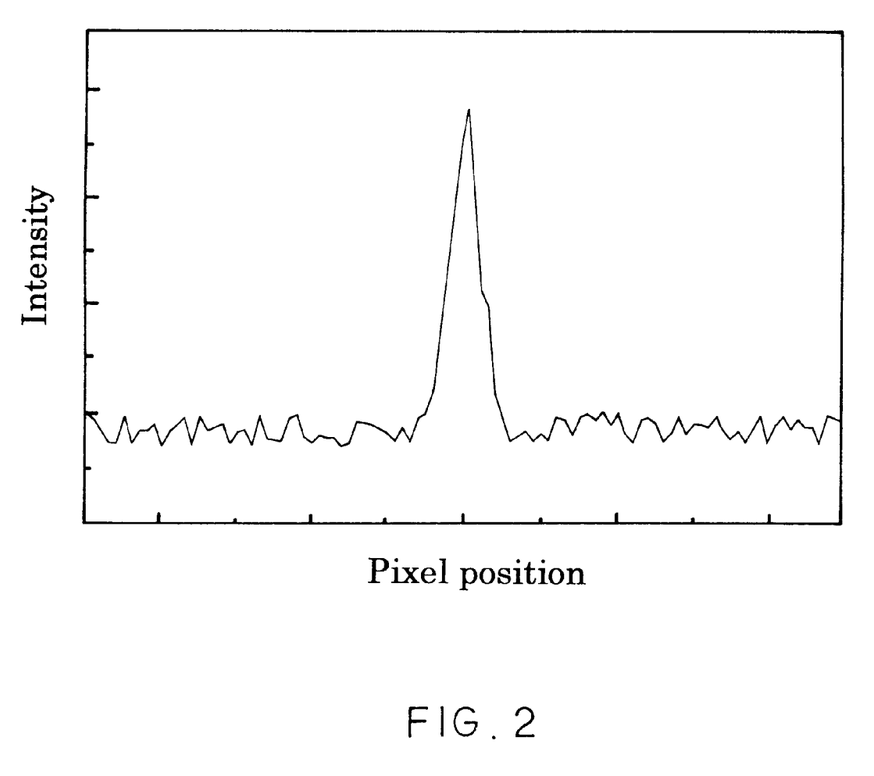
FIG. 2 is an explanatory drawing of the signal output of the PIN photodiode according to the same Embodiment.

When the PIN photodiode array 1 having n segments 13 is irradiated by detection light, the signals forming the intensity distribution as illustrated, for example as in FIG. 2, are output from the segments of the PIN photodiode array 1 at the same time. The signals output from the segments 13 are given to the parallel arithmetic processing portion 2, which has n input terminals 14. The parallel arithmetic processing portion 2 compares n input signals by the parallel arithmetic process and calculates the output position (the position of the segment in the PIN photodiode array 1) in which the intensity is maximum.

This PIN photodiode array has a response bandwidth up to about 1 GHz and its performance does not deteriorate by executing high speed sampling. The parallel arithmetic processing portion 2 executes the comparison operation at the cycle of more than tens of MHz by parallel operation. Consequently, the position detecting element using these can detect the position at the sampling rate of more than tens of MHz. Moreover, the resolution (normalized by the length of the PIN photodiode array) can be improved to $1/1000$ when the number n of the segments 13 is more than one thousand.

As explained above, compared to the position detecting element using the conventional PSD or CCD, the First Embodiment enables the position to be detected at high speed and high resolution by providing the PIN photodiode array 1 and the parallel arithmetic processing portion 2 that calculates the segment having maximum intensity.

A photo detection element array using another photodetector that can respond at high speed may be used instead of the PIN photodiode array.

(The Second Embodiment)

Figure 3:
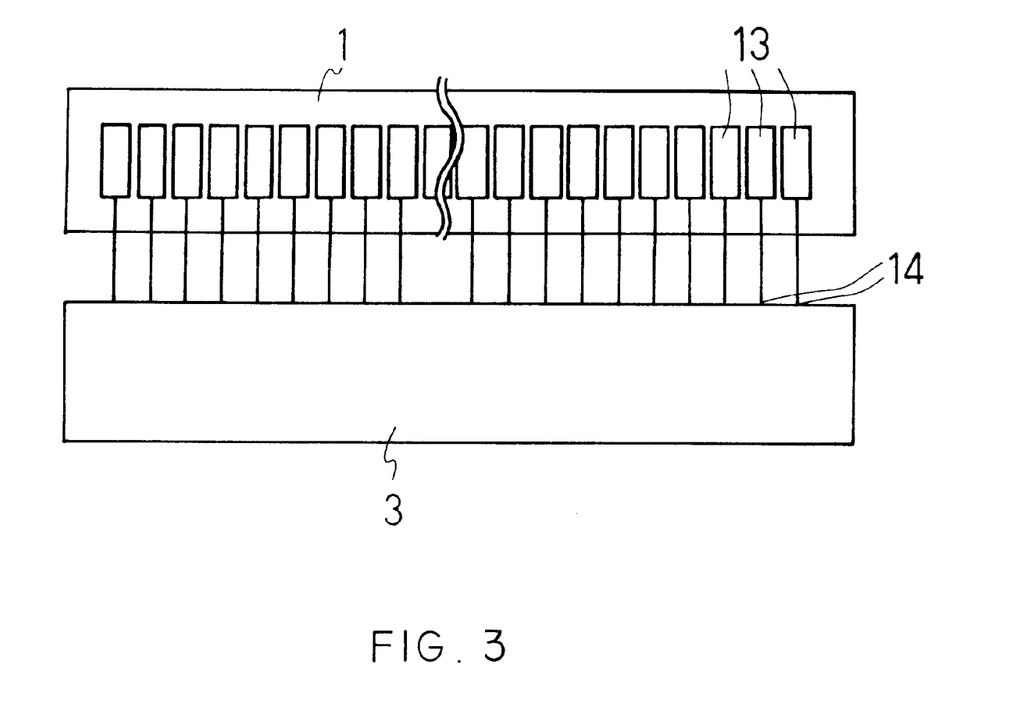
FIG. 3 shows a basic block diagram of the position detecting element according to the Second Embodiment in the present invention.

FIG. 3 shows a basic block diagram of the position detecting element according to the Second Embodiment in the present invention. FIG. 3 includes a PIN photodiode array 1 having n segments 13 and the parallel arithmetic processing portion 3 that calculates the maximum position of the intensity from n outputs of the PIN photodiode array with a precision of the sub-segment.

When the PIN photodiode array 1 having n segments 13 is irradiated by detection light, the signals forming the intensity distribution as illustrated in FIG. 2 are output from the segments 13 of the PIN photodiode array 1 at the same time. The signals output from the segments are given to the parallel arithmetic processing portion 3, which has n input terminals 14. The parallel arithmetic processing portion 3 calculates the maximum position of the intensity from n signals by the parallel operation using the operation method mentioned below.

Figure 4:
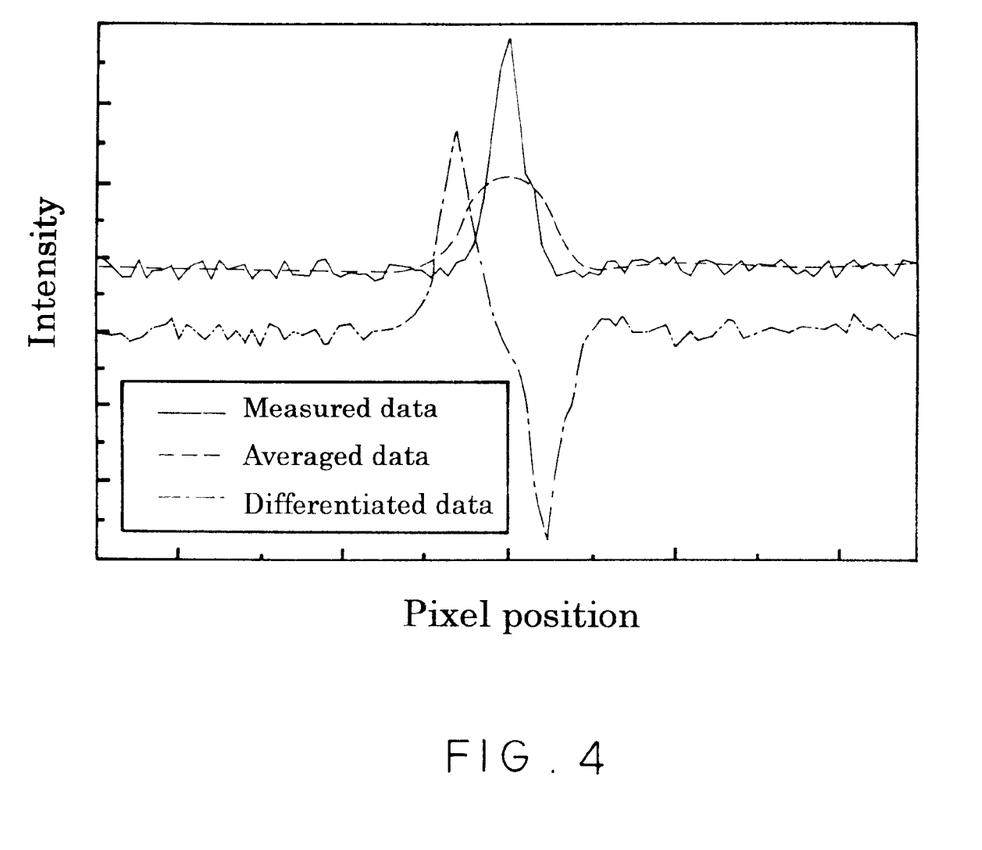
FIG. 4 is an explanatory drawing of the operation method according to the same Embodiment.

First, the moving average is calculated from the output signals of the segments 13 of the PIN photodiode array 1. As shown in FIG. 4, the distribution of the segment position of the moving average is shown with the broken line, while the distribution of the intensity obtained from the output signals of the segments is shown with the unbroken line. Next, the differential process is executed for obtaining the differential signal of the moving average. The differential signal has a distribution indicated with the alternate long and short dash line. Then the position of the zero crossing point of the differential signal is calculated by the least-squares method or the like using the differential signal near the zero crossing point. The precision in position of the zero crossing point determined by the above-mentioned method, i.e. the maximum position of the intensity, is smaller than the segment unit. That is, the position of the maximum intensity can be calculated in the sub-segment unit. According to experiment, this operation method enables the sub-segmentation up to about $1/10$ of the segment unit. Moreover, the operation mentioned above is executed by the parallel process in the same way as in the First Embodiment in order to improve the processing speed.

As in the First Embodiment, the PIN photodiode has a response bandwidth of up to about 1 GHz and its performance does not deteriorate by executing high speed sampling. The parallel arithmetic processing portion 3 calculating the maximum position executes the operation process cycle at a rate of more than tens of MHz by parallel operation. Consequently, such a position detecting element can detect the position at the sampling rate of more than tens of MHz.

The parallel arithmetic processing portion 3 in the present Embodiment, which is different from the parallel arithmetic processing portion 2 in the First Embodiment, calculates the maximum position of the intensity by the calculation of the moving average, the differential and the zero crossing point. Therefore, the position detected by the unit has a resolution which is smaller than the segment size. For instance, the resolution (normalized by the length of the PIN photodiode array) can be improved to $1/10000$ when the number of the segments is more than one thousand and each segment is divided into ten sub-segments.

As explained above, compared to the position detecting element using the conventional PSD or CCD, the Second Embodiment enables the position to be detected at high speed and high resolution by providing the PIN photodiode array 1 and the parallel arithmetic processing portion 3 that calculates the position in which the intensity is maximum with a precision of the sub-segment.

A photo detection element array using another photodetector that can respond at high speed may be used instead of the PIN photodiode array.

(The Third Embodiment)

Figure 5:
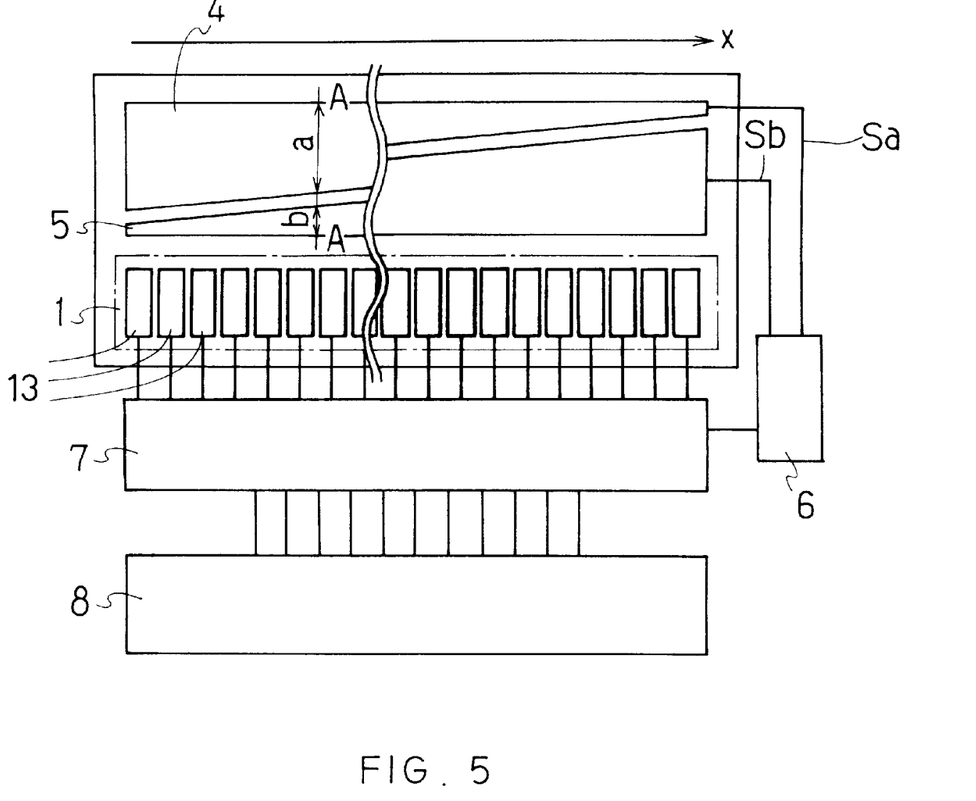
FIG. 5 shows a basic block diagram of the position detecting element according to the Third Embodiment in the present invention.

FIG. 5 shows a basic block diagram of the position detecting element according to the Third Embodiment in the present invention. FIG. 5 includes a PIN photodiode array 1 having n segments and a pair of wedge-shaped PIN photodiodes 4 and 5, which are positioned next to each other in the cross direction. The sum of each area width receiving light of a and b (see the line A—A in FIG. 5), which is expressed by a+b=c, is constant in the longitudinal direction (x direction in FIG. 5). Thus the area width receiving light a, which is a linear function of x, can be expressed by $a=\alpha x+\beta$, wherein $\alpha$ and $\beta$ indicate constants.

Numeral 6 indicates a first parallel arithmetic processing portion that calculates the rough position (hereafter referred to as a rough maximum position), in which the intensity of the detection light is maximum, from the pair of wedge-shaped PIN photodiodes 4 and 5. Numeral 7 shows a second parallel arithmetic processing portion, which extracts m (n>m) signals near the rough maximum position from n signal outputs of the PINT photodiode array 1 based on the rough maximum position of the detection light determined by the parallel arithmetic processing portion 6. Numeral 8 indicates a third parallel arithmetic processing portion that calculates the maximum position of the intensity based on m outputs from the second parallel arithmetic processing portion 7.

When the irradiated detection light reaches the PIN photodiode array 1 having n segments and a pair of wedge-shaped PIN photodiodes 4 and 5, the signals forming the intensity distribution as illustrated in FIG. 2 are output from the segments of the PIN photodiode array 1 at the same time and the signals Sa and Sb are output from the pair of wedge-shaped PIN photodiodes 4 and 5 at the same time. The signals Sa and Sb from the pair of wedge-shaped PIN photodiodes 4 and 5 are given to the first parallel arithmetic processing portion 6 calculating the rough position, and thereby the rough maximal position xo of the detection light is calculated by the following equation (Equation 2).

$$xo=(c \cdot Sa/(Sa+Sb)-\beta)/\alpha \qquad \text{Equation 2}$$

The principle that enables the rough maximum position xo to be calculated using the equation (Equation 2) will be briefly explained as follows. The signal Sa from the wedge-shaped PIN photodiode 4 is expressed by $Sa=K \cdot I \cdot a \cdot w$ and the signal Sb from another wedge-shaped PIN photodiode 5 by $Sb=K \cdot I \cdot b \cdot w$, wherein I indicates an energy density of the detection light, w a width and K a photo conversion constant of the PIN photodiode. The area width receiving light a of the PIN photodiode 4 is expressed by $a=\alpha x+\beta$ as mentioned before. When these equations are substituted into the equation (Equation 2), only x remains, so that the rough maximum position of the detection light can be determined.

This rough maximum position of the detection light is given to the second parallel arithmetic processing portion 7, to which the signals of the segments of the PIN photodiode array 1 also are given. Using the rough maximum position of the detection light determined by the first parallel arithmetic processing portion 6, m (n>m) signals near the rough maximum position are extracted from n signals of the PIN photodiode array 1. The signals of the rough maximum position from the first parallel arithmetic processing portion 6 are delayed compared with the signals from the PIN photodiode array 1 due to the time required for the operation process at the first parallel arithmetic processing portion 6. The lag caused by this delay time can be covered either by accelerating the operation process at the first parallel arithmetic processing portion 6 to the extent that the delay is not significant or by delaying the signals from the PIN photodiode array 1.

Next, the m signals near the rough maximum position extracted by the second parallel arithmetic processing portion 7 are given to the third parallel arithmetic processing portion 8. The third parallel arithmetic processing portion 8 calculates the maximum output position from m signals by the parallel operation using the same operation method as in the Second Embodiment.

As in the First Embodiment, the PIN photodiode has a response bandwidth up to about 1 GHz and its performance does not deteriorate by executing high speed sampling. The first parallel arithmetic processing portion 6, the second parallel arithmetic processing portion 7 and the third parallel arithmetic processing portion 8 execute the operation process cycle at a rate of more than tens of MHz by parallel operation. Consequently, such a position detecting element enables the position to be detected at the sampling rate of more than tens of MHz.

The third parallel arithmetic processing portion 8 in the present Embodiment calculates the maximum position of the intensity also by the calculation of the moving average, the differential and the zero crossing point. Therefore, the position resolution of the detection light can be improved as in the Second Embodiment.

This Embodiment is different from the First and Second Embodiments in that the rough maximum position of the detection light is calculated using the pair of wedge-shaped PIN photodiodes 4 and 5, the first parallel arithmetic processing portion 6 and the second parallel arithmetic processing portion 7 and then the number of the signals given to the third parallel arithmetic processing portion 8 is reduced from n to m. As a result, the circuit structure of the third parallel arithmetic processing portion 8 is simplified, and a smaller circuit can be realized. Therefore, the effect of heat generation is reduced, which occurs when the large-scale circuit is driven. Moreover, the small-scale circuit enables lower manufacturing cost.

As in the Embodiments mentioned already, a photo detection element array using another photodetector which can respond at high speed may be used instead of the PIN photodiode array.

(The Fourth Embodiment)

Figure 6:
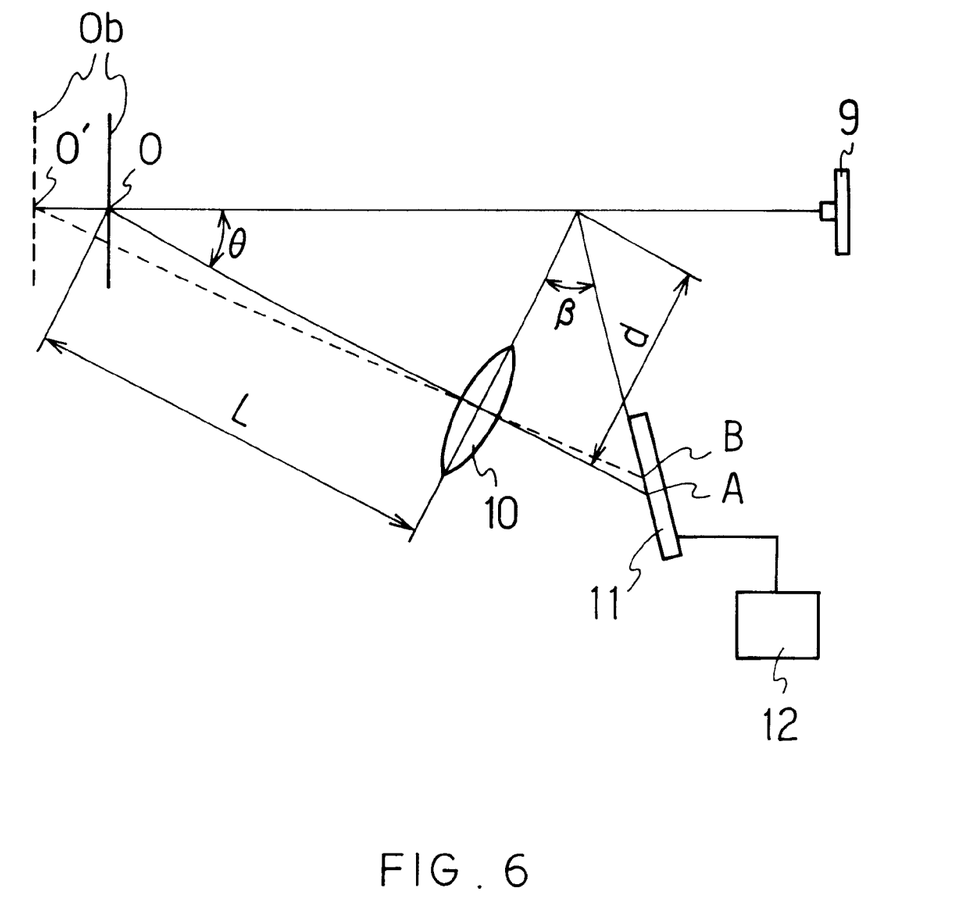
FIG. 6 shows a basic block diagram of the range sensor according to the Fourth Embodiment in the present invention.

FIG. 6 shows a basic block diagram of the range sensor according to the Fourth Embodiment in the present invention. FIG. 6 includes (1) a light source 9 that irradiates the object to be measured, which is composed of the emitting elements such as a light-emitting diode, a semiconductor laser and the like, (2) a lens 10 whose focal length is f, (3) the position detecting element 11 mentioned in the First Embodiment and (4) a range calculator 12 that calculates the distance by using the position output of the position detecting element 11. Like the conventional optical system illustrated in FIG. 7, the optical system composed of these elements is structured in order to fulfill the Scheimpflug condition of the equation (Equation 1).

When the Scheimpflug condition is fulfilled, as in the conventional example, the optical beam reflected by the object to be measured Ob after exiting from the light source 9 forms images on the position detecting element 11 by the lens 10 in case where the object to be measured Ob is located not only at the intersection O of the emitting element 9 and the optical axis of the lens 10 but also at the position O' deviated from the intersection O on the optical axis as shown by the broken line.

The part of the light reflected from the object to be measured Ob forms images at point A on the position detecting element 11 by the lens 10, when the object to be measured Ob is located at the position O. The part of the light reflected from the object to be measured Ob forms images at point B on the position detecting element 11 as shown by the broken line when the object to be measured Ob is deviated to the position O'. Thus, the position of the object to be measured on the optical axis of the light source 9 is converted into the position of the image-formation on the position detecting element 11. Consequently, the distance to the object to be measured can be calculated by inputting the position of the image-formation on the position detecting element 11 into the range calculating means 12 in which the relation between the position of the object to be measured and the position of the image-formation on the position detecting element 11 has been memorized.

As mentioned in the First Embodiment, the range sensor according to this Embodiment using this position detecting element 11 enables the distance to be measured at high speed and high precision, since the position detecting element 11 using the PIN photodiode array and the like can detect the position at high speed and high precision compared to the position detecting element using the conventional PSD, CCD and etc.

In addition, the position detecting element 11 used in this Embodiment is not limited to the one mentioned in the First Embodiment. The position detecting elements mentioned in the Second and Third Embodiments can be also used. A lens that gathers rays of the light can be provided between the light source 9 and the object to be measured Ob as in the conventional example illustrated in FIG. 7. It also can be structured in order to irradiate the object to be measured Ob by the optical beam that was gathered by other means.

As explained above, the position detecting element according to the present invention includes the photo detection element array having n segments and the parallel arithmetic processing portion which calculates the segment having maximum intensity, thereby a large number of pixels can be processed in parallel. As a result, the position of the detection light can be detected at high speed and high precision. Moreover, the range sensor using this kind of position detecting element according to the present invention can detect the position of the detection light at high speed and high precision. Consequently, the distance to the object to be measured can be detected at high speed and high precision.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to embraced by the claims.

What is claimed is:

1. A position detecting element, comprising a photo detection element array having n segments and a parallel arithmetic processing portion that calculates a peak position of the intensity with a precision of a sub-segment, wherein the parallel arithmetic processing portion calculates the peak position of the intensity with the following steps:

calculating a moving average from the output signals of the segments of the photo detection element array;

executing a differential process for obtaining a differential signal of the moving average;

calculating a position of the zero crossing point of the differential signal to obtain the peak position of the intensity at sub-segment precision.

2. A range sensor, comprising (1) a light source by which an object to be measured is irradiated by optical beam, (2) a lens that gathers rays of reflected light from a surface of the object to be measured and (3) a position detecting element according to claim 1 that detects the position of the light gathered by the lens.

3. A position detecting element, comprising (1) a photo detection element array having n segments, (2) a pair of wedge-shaped photo detection elements, (3) a first parallel arithmetic processing portion that calculates a rough position in which light intensity is maximum based on the output from the pair of photo detection elements, (4) a second parallel arithmetic processing portion that selects m signals near the rough position from the outputs of the segments in the photo detection element array based on the rough position in which the intensity is maximum calculated by the first parallel arithmetic processing portion, wherein n>m, and (5) a third parallel arithmetic processing portion that calculates a maximum position of the intensity with a precision of a sub-segment, wherein the third parallel arithmetic processing portion calculates the maximum position of the intensity with the following steps:

calculating a moving average from the output signals of the second parallel arithmetic processing portion;

executing a differential process for obtaining a differential signal of the moving average;

calculating a position of the zero crossing point of the differential signal to obtain the maximum position of the intensity at sub-segment precision.

4. A range sensor, comprising (1) a light source by which an object to be measured is irradiated by optical beam, (2) a lens that gathers rays of reflected light from a surface of the object to be measured and (3) a position detecting element according to claim 3 that detects the position of the light gathered by the lens.

* * * * *